Patented Feb. 16, 1954

2,669,598

UNITED STATES PATENT OFFICE 2,669,598

PROCESS FOR MANUFACTURING POROUS CARBON ELECTRODES

Adolf Marko and Karl Kordesch, Vienna, Austria, assignors to Olga Burkli, née Bleuler, Zurich, Switzerland No Drawing. Application May 14, 1952, Serial No. 287,812

Claims priority, application Austria March 24, 1949

7 Claims. (Cl. 136—122)

The present application is a continuation-in-part of our copending application Serial No. 146,928, filed on February 28, 1950, now Patent No. 2,615,932 entitled "Process for Manufacturing Porous Carbon Electrodes." This invention relates to a process for manufacturing porous carbon electrodes, which are depolarized by pure or atmospheric oxygen and are used, e. g. in primary cells.

Various primary cells are known in which a porous body of carbon preferably of active carbon is used as positive electrode, through the pores of which air or pure oxygen enters as a depolarizer to the electrode surface, if desired under increased pressure. In most of these cases a weakly acid or alkaline electrolyte is used and the solvent electrode is made of zinc in general. In all these cells as a rule the current density at the surface of the carbon electrode must not exceed 0.3 mA./sq. cm., or about 1 mA./c. cm. of the effective carbon body, in continuous operation because otherwise the voltage drop would become inadmissibly large. The open-circuit voltage of the conventional carbon electrodes against zinc is about 1.4 v., that is, about 0.2 v. below the theoretically possible value of 1.59 v.

In order to reduce the dimensions of such carbon electrodes and the internal resistance of the primary cell, it has been proposed to combine active carbon with oxidation catalysts, which may be selected, e. g. from among various compounds of manganese, copper, silver, vanadium, uranium, titanium, iron, cobalt, the rare earths, etc., and possibly to combine several of the aforementioned compounds in order to increase their catalytic efficiency. One of these suggestions relates to the impregnation of a carbon electrode body with a solution of the catalyst, and subsequent drying. No satisfactory results, however, have been obtained. An allegedly improved process consists in mixing wood meal with a solution of the catalyst, forming the mix into shapes, and carbonizing the shaped bodies at 800° C. in a current of steam. This process has not found commercial acceptance either.

The main object of our present invention is to provide a new process for manufacturing porous carbon electrodes for use in oxygen depolarized primary cells, which process results in electrodes having substantially improved effectiveness as compared with hitherto known oxygen depolarized carbon electrodes.

The process according to the invention consists substantially in that porous carbon bodies are impregnated with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being of the kind capable of acting as oxidising agent on the carbon, and that the impregnated carbon bodies are heated to temperatures at which the salts decompose with the formation of catalysts, viz. metal or metal compounds having a catalysing action. It has been found that within the scope of this process best results are obtained by stoichiometrically proportioning the salts of the various metals used, so that during the subsequent heat-treatment most likely spinels are formed.

The various salts may have different acid radicals acting as oxidising agent on the carbon. Chiefly to be taken into consideration as heat-decomposable salts effecting oxidation are the nitrates and nitrites, that is, the salts of nitric or nitrous acids. Other salts of this kind are these of chloric acid, chromic acid, oxalic acid, acetic acid, formic acid, and others. Within the scope of this process the salts of the above-mentioned organic acids, i. e. oxalic acid, acetic acid, and formic acid, are to be considered as oxidizing salts, these salts, when subsequently heated, splitting off $CO_2$ which at elevated temperature oxidizes the carbon. Not useful, however, are the sulphates, which are decomposable only with difficulty.

It has also been found that the catalytic effect can be enhanced by the participation of earth-alkali salts viz. salts of magnesium, calcium, strontium, barium and beryllium in the impregnation. These additional salts are also used in the form of their heat-decomposable compounds effecting oxidation.

According to a special modification of the invention the carbon bodies before being impregnated with the salt solution of the kind described, are subjected to a pretreatment with agents which attack the internal surface of the carbon and thus prepare it for the reception of the impregnating solution and for the reactions to be effected by the heat treatment. Examples of such agents are concentrated hydrochloric acid, nitric acid, etc., or mixtures of hydrochloric acid and nitric acid, etc., to which hydrofluoric acid may be added, if desired.

As compared with known electrodes the electrodes according to the invention show a surprisingly enhanced effectiveness. It is possible, e. g., to achieve with air depolarization a continuous current density from 10 mA./sq. cm. to 30 mA./sq. cm. Hence, the electrodes are much smaller for the same output, and much more efficient for the same size, than the known electrodes. Moreover, the electrodes according to the invention have the remarkable property of being reversible, giving when connected against a hydrogen electrode the theoretical open-circuit voltage of 1.23 v.; accordingly against zinc the theoretical open-circuit voltage of 1.59 v. is obtained. These values are based on the assumption that the electrode is dry, that is, not soaked through by the electrolyte. In the moistened condition the reversible $$HO_{\overline{1}}^-$$

voltage of 1.47 v. against zinc is obtained in a 5 to 6 normal sodium lye. Not being subject to consumption the electrodes may be used permanently and may be employed in dry or wet primary cells with alkaline electrolytes.

In making the electrodes preferably carbon having microporous structure is used as a raw material. Commercially available arc-lamp carbon has proved well for this purpose. Suitable carbon bodies are used which have a central bore which ensures a good soaking through of the entire body with the catalyst solution and later, when the carbon is used in primary cells, permits the access of air or oxygen. Suitably the commercial carbon is freed, e. g. by being glowed through, if desired in a stream of $CO_2$ from any impurities before being processed and subjected as explained above to a pretreatment with surface-attacking agents.

Subsequently the carbon is impregnated, preferably in that the salt solution is either sucked through the pores of the carbon bodies by reduced pressure or pressed into the pores by increased pressure. The central bore of the carbon bodies facilitates the complete soaking through of the carbon bodies with the salt solution. After being soaked the carbon bodies are heated for a prolonged period of time to the decomposition temperature of the salts so that the salts are transformed into active metals or metal compounds. The temperature applied, depending on the decomposition temperature of the salts used, generally lies above 700° or 800° C., in order to enhance the formation of spinels and of active compounds highly resistant to glowing which are insoluble in an alkaline electrolyte. When salts such as the nitrates are used for the impregnation which on decomposing yield compounds attacking the surface of the carbon, the inside surface of the carbon is activated during said step.

The thus obtained carbon bodies may be used in primary cells together with an alkaline electrolyte and with zinc as a solvent electrode. If the supply of the depolarizing oxygen or of the air to the electrode takes place under normal atmospheric pressure, measures must be taken to prevent the entry of the liquid electrolyte into the porous passages of the carbon body. For this purpose the electrodes may be provided in the manner known with a water repellent coating, e. g. of paraffin. If the electrodes are used in elements to which air or pure oxygen is supplied under increased pressure, this measure may be omitted, if desired.

*Example 1*

A cylindrical body of arc-lamp carbon, having a diameter of 15 mm., and a height of 100 mm., with a 6 mm. diameter central bore, is glowed through in a dry condition at temperatures of 900° C. and subsequently treated for several hours with 50% aqueous nitric acid. The thus pretreated carbon body is heated for drying. The impregnation of the carbon body is carried out with a solution composed as follows, which is sucked through the carbon body:

| | G. |
|---|---|
| $Co(NO_3)_2$ | 1.5 |
| $Al(NO_3)_3$ | 3.5 | in 100 g. of distilled water.

The carbon bodies impregnated with this salt solution are heated to a temperature between 700° and 1000° C., preferably above 800° C., whereby the metal salts contained in the above mentioned solution decompose and form catalytically effective metals and metal compounds, most likely in the form of spinels. If desired, the electrode is immersed in a manner known per se in a solution of paraffin in volatile solvents, which are driven away subsequently. The thus manufactured electrode may be used in a primary cell with oxygen or air depolarization.

*Example 2*

The carbon electrode glowed through as set forth in Example 1 is impregnated with a solution composed as follows:

| | G. |
|---|---|
| $Ni(NO_3)_2.6H_2O$ | 1.45 |
| $Al(NO_3)_3.9H_2O$ | 3.75 | filled up to 100 g. with distilled water.

The impregnated carbon electrode is heated in an inert atmosphere or in $CO_2$ between 700 and 1000° C. and is ready for use after having been treated with paraffin.

Further examples for the impregnating solution, which may be used after a pretreatment according to Example 1 or may contain additionally an agent capable of attacking carbon are:

*Example 3*

| | G |
|---|---|
| $Mn(NO_3)_2.6H_2O$ | 1.43 |
| $Al(NO_3)_3.9H_2O$ | 3.75 | filled up to 30 ccm. with water.

*Example 4*

| | G |
|---|---|
| $NH_4VO_3$ in 15 ccm. concentrated $HNO_3$ | 2.34 |
| $Al(NO_3)_3.9H_2O$ | 3.75 | filled up to 60 ccm. with water.

*Example 5*

| | G |
|---|---|
| $Ag(NO_3)$ | 1.7 |
| $Al(NO_3)_3.9H_2O$ | 3.75 | filled up to 30 ccm. with water.

*Example 6*

| | G |
|---|---|
| $UO_2(NO_3)_2.6H_2O$ | 5 |
| $Al(NO_3)_3.9H_2O$ | 3.75 | filled up to 30 ccm. with water.

*Example 7*

| | G |
|---|---|
| $Fe(NO_3)_3.9H_2O$ | 4.04 |
| $Al(NO_3)_3.9H_2O$ | 3.75 | filled up to 50 ccm. with water.

*Example 8*

| | G |
|---|---|
| $Mn(NO_3)_2.6H_2O$ | 1.65 |
| $Cu(NO_3)_2.3H_2O$ | 0.9 |
| $Co(NO_3)_2.6H_2O$ | 0.53 |
| $AgNO_3$ | 0.07 |
| $Al(NO_3)_3.9H_2O$ | 8.7 | filled up to 100 ccm. with water.

Example 9

| | G |
|---|---|
| $Ce(NO_3)_3.6H_2O$ | 4.34 |
| $Al(NO_3)_3.9H_2O$ | 3.75 |
| filled up to 50 ccm. with water. | |

Example 10

| | G |
|---|---|
| $Th(NO_3)_4.6H_2O$ | 5.9 |
| $Al(NO_3)_3.9H_2O$ | 3.75 |
| filled up to 50 ccm. with water. | |

The carbon electrodes made according to the above examples are reversible and give a load capacity which, assuring air depolarization, is at least 10 to 30 times higher than the load capacity of the known electrodes. If the depolarization is carried out with pure oxygen the load capacity is increased 150-fold, that is, to about five times the load capacity achievable with air depolarization. The electrodes need not be paraffined if the air or oxygen is supplied to the electrodes under pressure.

What we claim is:

1. In a process for manufacturing porous carbon electrodes for use in oxygen depolarized primary cells the steps of impregnating porous carbon bodies with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being capable of acting as oxidising agent on the carbon, and heating the impregnated carbon bodies to temperatures adapted to decompose the said salts with the formation of catalysts within said carbon bodies.

2. A process as claimed in claim 1, wherein an impregnating solution containing the salts in stoichiometrical proportions is used.

3. In a process for manufacturing porous carbon electrodes for use in oxygen depolarized primary cells the steps of treating porous carbon bodies with agents capable of attacking carbon, impregnating said bodies with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being capable of acting as oxidising agent on the carbon, and heating the impregnated carbon bodies to temperatures adapted to decompose the said salts with the formation of catalysts within said carbon bodies.

4. In a process for manufacturing porous carbon electrodes for use in oxygen depolarized primary cells the steps of impregnating porous carbon bodies with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being capable of acting as oxidising agent on the carbon, said solution containing agents capable of attacking carbon, and heating the impregnated carbon bodies to temperatures adapted to decompose the said salts with the formation of catalysts within said carbon bodies.

5. In a process for manufacturing porous carbon electrodes for use in oxygen depolarized primary cells the steps of impregnating porous carbon bodies with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being capable of acting as oxidising agent on the carbon, said solution containing in addition at least one salt of an earth alkali metal, and heating the impregnated carbon bodies to temperatures adapted to decompose the said salts with the formation of catalysts within said carbon bodies.

6. In a process for manufacturing porous carbon electrodes for use in oxygen depolarized primary cells the steps of impregnating porous carbon bodies with a solution of at least one heat-decomposable salt of a heavy metal selected from the group consisting of iron, cobalt, nickel, manganese, chromium, copper, silver, gold, platinum, vanadium, titanium, uranium, thorium and the rare earths, and of at least one heat-decomposable salt of aluminium, said salts being selected from the group consisting of the nitrates, nitrites, chromates, chlorates, oxalates, acetates and formates of the said metals, and heating the impregnated carbon bodies to temperatures adapted to decompose the said salts with the formation of catalysts within said carbon bodies.

7. An oxygen depolarized electrode for a primary cell manufactured according to the process of claim 1.

ADOLF MARKO.
KARL KORDESCH.

References Cited in the file of this patent

UNITED STATES PATENTS

| Number | Name | Date |
|---|---|---|
| 325,822 | Coxeter et al. | Sept. 8, 1885 |
| 421,469 | Adeney | Feb. 18, 1890 |
| 2,120,618 | Martus et al. | June 14, 1938 |